March 15, 1932. D. R. DAVIES 1,849,224
ELECTRICAL SWITCH GEAR
Filed Dec. 28, 1927
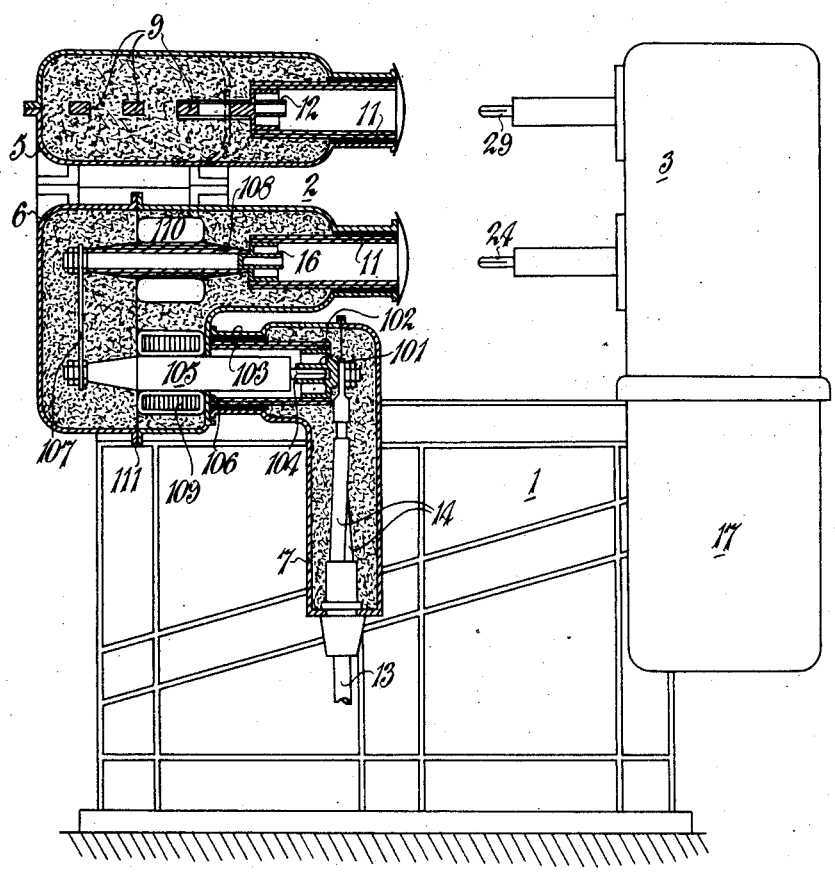
Inventor
David Reginald Davies.
By
Attorney.

Patented Mar. 15, 1932

1,849,224

UNITED STATES PATENT OFFICE

DAVID REGINALD DAVIES, OF DIDSBURY, NEAR MANCHESTER, ENGLAND, ASSIGNOR TO WESTINGHOUSE ELECTRIC AND MANUFACTURING COMPANY, A CORPORATION OF PENNSYLVANIA

ELECTRICAL SWITCH GEAR

Application filed December 28, 1927, Serial No. 243,087, and in Great Britain October 9, 1926.

This invention relates to electrical switch gear which comprises one or more sets of bus-bars, a circuit breaker for connecting said bus-bars to a cable, isolating switches for said circuit breaker, and one or more current transformers such as for instruments and protection. The invention particularly relates to switch gear of this type having the devices enclosed in metal casings, some of which, for instance the bus-bar chamber or chambers, the cable dividing or trifurcating box and the transformer casing, are filled with solid insulating compound or other insulating material.

According to the invention the current transformer or transformers is, or are, housed in a section of the metal casings which is easily separable from the remainder of the fixed structure, and plug-and-socket connectors effect the electrical connection of the current transformers with other conductors of the switch gear, for instance with the conductors of the cable after trifurcation or division and with the leads of the oil switch so that the casing containing the current transformers may be removed without disturbing the insulating compound in either the transformer casing or the cable dividing or trifurcating box or other electrically adjacent casing or casings.

One particular arrangement of switchgear of the type specified and to which the present invention can be applied, is illustrated in and described with reference to Fig. 1 of the drawings of the copending application, Serial No. 70,547 and reference may be had to this said application for supplementing the following description with reference to the drawing herewith, in which: The single figure illustrates a switchgear of generally similar arrangement or layout but with the alternative connection feature forming the subject of the aforesaid application omitted, whilst certain members of the switchgear which per se form no part of the present invention are not shown in detail. The accompanying drawing represents by way of example only one convenient embodiment and subsidiary feature of the present invention.

Referring to the accompanying drawing and to Fig. 1 of the aforesaid application, the switchgear illustrated comprises in general a framework 1 carrying at the left-hand end, namely, at the rear end of the switchgear, the fixed portion 2 of the latter whilst at the right-hand end or front the movable or draw-out portions 3 is disposed, the latter portion being arranged to slide horizontally upon rails and being provided with mechanism (not shown) for drawing it in or out with respect to the fixed portion 2 of the gear, in a manner which per se is well known.

The fixed portion 2 of the switchgear comprises two compound-filled metal casings 5 and 6 and a compound-filled cable trifurcating box 7, it being assumed that the switchgear controls a three-phase electrical system. The bus-bar chamber 5 contains three bus-bars 9. If alternative sets of bus-bars are required an additional bus-bar chamber similar to the bus-bar chamber 5 may be provided as described in the aforesaid application. The bus-bars 9 are respectively connected to three sockets 12 disposed in a horizontal plane and located within tubes 11 of insulating material which are disposed within tubular extensions of the chamber or casing 5 as shown.

A cable or feeder 13 entering the trifurcating box 7 has three phase conductors 14, which are connected respectively with the three socket contacts 101. The latter are located in a horizontal plane in insulating tubes 102, disposed in tubular extensions 103 of the trifurcating box 7 as clearly shown, the arrangement being similar to the sockets 12 and tubes 11 in the bus-bar chamber or casing 5. As described in the aforesaid application Serial No. 70,547 the casing 6 is provided with three sockets 16 located in insulating tubes 11 disposed in tubular extensions of the casing. The sockets 16, in accordance with the present invention, are connected with the cable conductors 14 by the plug contacts 104 located in insulating bushings 105 projecting from the front face 106 of the lower portion of the casing 6, the plug contacts 104 at their other ends being connected by means of conductors 107 with the rear ends of the socket members 16.

The current transformers are located in the casing 6 conveniently upon the bushings 105 which surround the plug contacts 104 and upon bushings 108 which surround the socket contacts 16, said transformers being indicated at 109 and 110 respectively. The casing 6 may for convenience be split at 111 so that if necessary access can be had to the transformers by the removal of the rear part of the casing and by chipping away or melting the compound filling therein. The connectors 107 are conveniently secured by means of nuts so that they can be readily detached if required.

It will of course be understood that the movable portion 3 of the switchgear comprises sets of plug contacts 24 and 29 which are permanently connected to the terminals of the oil circuit breaker 17.

As hereinbefore set forth, it will be appreciated that by reason of the provision of the co-operating contacts 101 and 104, the casing 6 may be bodily removed from the remaining portion of the switchgear without disturbing the insulating compound and may be replaced by another similar casing.

The potential transformer (not shown) when used is preferably adapted to have a plug and socket connection with the conductors in the transformer casing and may be disposed at the front or the rear of the latter or underneath it as may be found convenient.

It will be understood that various other arrangements of the invention are possible. For instance, it may equally well be applied to switchgear in which the isolation is effected by vertical movements of a part or parts thereof with respect to fixed portions, similarly the removable chamber may be separable by a vertical movement; the transformers may be located in a chamber which is dissociated from that which carries main isolating switch contacts.

I claim as my invention:—

1. In an electrical switchgear of the metal-clad type, a removable conducting bushing, a metal casing enclosing said bushing and removable therewith, a transformer associated with the bushing within the casing, metal-clad electrical conductors, a removable metal-clad circuit interrupter, and a portion of a plug-and-socket connection associated with each end of the said bushing and with the said conductors and the said circuit interrupter.

2. An electrical switchgear of the kind described comprising a current transformer housed in a section of metal casing that is removable from adjacent conductors, a metal-clad electrical circuit, a removable metal-clad circuit interrupter, all connected in series and a plug-and-socket connection associated with the ends of said transformer, the electrical circuit and the circuit interrupter, whereby after the circuit interrupter is separated from the electrical circuit and the current transformer, the current transformer and metal casing may be separated and removed from the metal-clad electrical circuit.

3. In an electrical switchgear of the metal-clad type including a metal-clad circuit, a removable metal-clad circuit interrupter in series therewith, and a removable metal-clad section positioned between one portion of the circuit and the circuit interrupter, said metal-clad section being removable as a unit and including a conductor, a metal casing enclosing the same and solid insulating material between the conductor and the casing.

4. In an electrical switchgear of the metal-clad type, the combination of a trifurcating box for a three-phase circuit, a removable metal casing enclosing conductors and electrical apparatus having separable means associated with the trifurcating box and a removable metal-clad three-pole circuit interrupter separably associated with the conductors of the metal casing whereby the casing and the circuit interrupter may be selectively removed from the circuit.

5. Electrical switchgear of the metal-clad type including conductors of an electrical circuit, a removable section containing electrical apparatus separably associated with said conductors and a circuit interrupter separably associated directly with the removable section.

6. In electrical switchgear, the combination of a stationary conductor, a removable metal casing containing a second conductor insulated from the casing and also containing a current transformer associated with the second conductor, a plug-and-socket connection for connecting said conductors, a third conductor, a movable circuit breaker having plug-and-socket connections with the second conductor and the third conductor, whereby said casing carrying the second conductor and the current transformer may be readily removed and replaced.

In testimony whereof I have hereunto subscribed my name this 12th day of December, 1927.

DAVID REGINALD DAVIES.